Sept. 2, 1958  J. J. NOLAN  2,849,916
CARD PHOTOGRAPHING MACHINE
Filed July 5, 1955  4 Sheets-Sheet 1

INVENTOR.
JOHN J. NOLAN
BY
AGENT

Sept. 2, 1958              J. J. NOLAN             2,849,916

CARD PHOTOGRAPHING MACHINE

Filed July 5, 1955                                          4 Sheets-Sheet 2

Sept. 2, 1958 J. J. NOLAN 2,849,916
CARD PHOTOGRAPHING MACHINE
Filed July 5, 1955 4 Sheets-Sheet 4

FIG.7

United States Patent Office 2,849,916
Patented Sept. 2, 1958

2,849,916

CARD PHOTOGRAPHING MACHINE

John J. Nolan, Santa Clara, Calif., assignor to International Business Machines Corporation, New York, N. Y., a corporation of New York Application July 5, 1955, Serial No. 519,766

14 Claims. (Cl. 88—24)

This invention relates to a record card photographing machine and more particularly to a machine for photographically compiling continuous listings of data recorded in varying sized groupings on individual record cards.

One of the many problems today facing information gathering agencies, such as Research Libraries and Credit Bureaus, is that of periodically preparing complete and up-to-date reports on different subjects or groups of subjects with a minimum of expense. The crux of the problem lies in the fact that such agencies are constantly receiving new information which must be promptly collated with that already on hand so that all information will be included in any reports thereafter prepared. Some organizations prepare their reports from type which is kept set up, and changed for each new report to incorporate additional information received since the preparing of the last report. Such a procedure is costly, especially where the periodic changes in the information reported are numerous, and would be almost prohibitive where reports on a particular subject or group of subjects are to be prepared upon request.

It is proposed that the utilization of record cards such as the well-known IBM record card both as an index card for regular file maintenance and as a source document from which periodic and special reports might be automatically prepared, offers an efficient and economical solution to this problem. According to the proposed procedure each record or index card would contain classification data in the form of coded perforations indicative of the information contained thereon, as well as the information itself printed on the face of the card. The number of lines of printing might be varied from one line to a plurality of lines covering the entire face of the card, according to the amount of information contained in the particular item. A code punch might also be included to indicate the number of lines of printing contained on the particular record. The utilization of such a system simplifies the task of keeping the files current, since as new information is received it is only necessary to prepare new index cards containing this information, and insert them in their proper place in the index file. Since each card contains coded classification perforations, the cards may be grouped into a variety of classifications with the use of well-known record card sorting and collating equipment.

The principal object of the present invention is to provide a machine capable of quickly and economically compiling on film continuous listings of the informational items contained on a plurality of such index cards.

In carrying out this object, the machine disclosed as embodying the present invention includes a card hopper into which are placed the index cards from which the desired report is to be compiled and a pair of high speed feed rolls disposed to receive said cards as they are fed from the hopper. Means are provided to cause the cards to be fed individually from the hopper to the high speed feed rolls, with the cards spaced apart a distance proportional to the number of lines of printing on each card. A pair of slow speed feed rolls are disposed to receive in an overlapping relationship the cards fed individually from the high speed feed rolls, the amount of overlapping varying with the distance between the cards as they are fed from the hopper so that only that portion of each card which contains printing will be uncovered. A conveyer belt is disposed to receive the overlapped cards from the slow speed feed rolls and carry them past a photographing device which is periodically actuated so that each frame of film will be exposed to record a uniform number of successive printing lines contained on the uncovered portions of the cards being fed. The film thus obtained may be used with well-known photo-offset equipment in order to procure the printed report desired to be prepared.

Thus it becomes another object of the invention to provide a machine capable of receiving a plurality of individual records having randomly spaced printing thereon, and translating said records to a card photographing station in an overlapping relationship with only a selected portion of each record being exposed.

Other objects of the invention will be pointed out in the following description and claims and illustrated in the accompanying drawings, which disclose, by way of examples, the principle of the invention and the best mode, which has been contemplated, of applying that principle.

Before describing in detail the components of the machine, it is deemed advisable to broadly state the mode of operation and functional results sought to be obtained. The input of the machine is in the form of record cards. Each of the input record cards may contain one or more lines of printing, and a control punch indicative of the number of lines thereon. The output of the machine is in the form of a roll of film containing a plurality of uniform frames, each of which has been exposed to record a like number of continuous printing lines. The transfer of the information printed on non-uniform portions of a plurality of such records to the film in the form of a continuous listing is accomplished by so feeding the records into the photographing area of the machine that each successive record overlaps that portion of the previously fed record which does not contain printing leaving exposed only the portion of each record which contains printing. The overlapping is such that the spacing from the last exposed line on one record to the top or first line of printing on the succeeding record is equal to the line spacing on the individual records, so that the printing on the successively fed cards is presented to the photographic area as a continuous succession of equally spaced lines. Thus by periodically actuating the camera and advancing the film a like distance between successive actuations, each frame of the film will be exposed to record thereon a like number of printing lines and the successive frames of film will contain a continuous equally spaced listing of the printed information contained on the input record cards. Each frame of film may be later used with photo-offset printing equipment as the basis for a single page, or portion of a page, of a complete report to be printed.

Figures 1, 2:
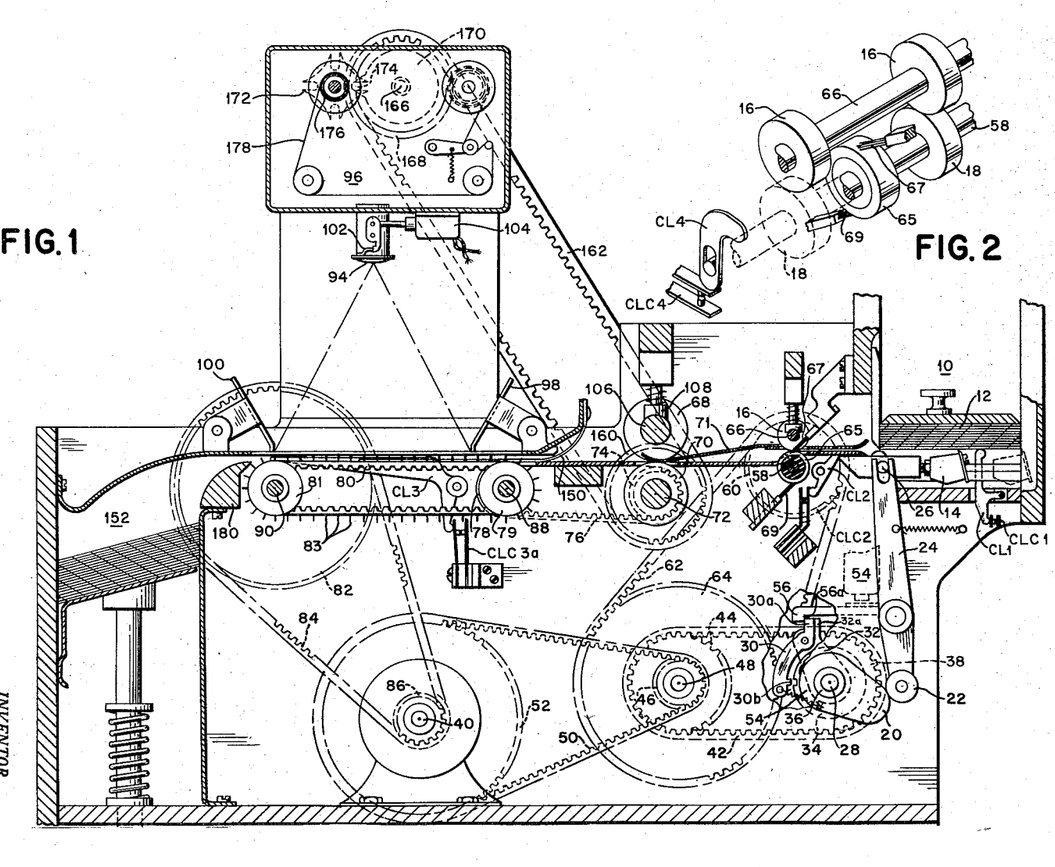
Fig. 1 is a sectional elevation taken through the center of the machine.
Fig. 2 is a detail view of the high speed feed rolls.

Now referring to the drawings and particularly to Fig. 1, 10 is a card feed hopper into which are placed record cards 12 from which the desired report is to be prepared. The cards are fed individually from the hopper 10 to a first pair of feed rolls 16 and 18 (Fig. 2) by the feed knife 14. Feed knife 14 is reciprocated by the action of a cam 20 against cam follower 22 mounted on one end of cam follower arm 24, which arm at its other end is slotted to engage a stud 26 on the feed knife. Cam 20 is mounted on shaft 28 to which shaft is also connected clutch arm 32 pivotally carrying clutch pawl 30, which arm and pawl constitute the driven elements of a single revolution clutch. The driving element of this clutch, single tooth ratchet wheel 34, is secured to hub 36 which is freely mounted on shaft 28. To the other end of hub 36 there is attached a pulley 38 which is constantly driven in a counterclockwise direction since it is drivably connected to continuously running motor shaft 40. The driving connection extends from the pulley 38 through belt 42, pulleys 44 and 46 both of which are secured to shaft 48, and belt 50 to pulley 52 which is secured to the motor driven shaft 40.

A feed cycle of card feed knife 14 is initiated by energization of clutch magnet 54. This magnet when energized will attract armature 56, which armature is pivotally mounted and normally biased to the position of Fig. 1 by a spring not shown. Attraction of the armature 56 by the magnet 54 will raise the latching notch 56a away from the shoulders 32a and 30a on the clutch arm 32 and pawl 30, respectively, allowing the pawl to be pivoted counterclockwise on the clutch arm by spring 54, and thus causing engagement of tooth 30b with the notch in ratchet wheel 34. Once energized, pawl 30 and clutch arm 32 will be rotated with ratchet wheel 34 as will shaft 28 to which arm 32 is secured. Deenergization of the magnet 54, during this revolution, will allow the armature 56 to return to the position in Fig. 1, in which position, it will reengage shoulders 30a and 32a, and thus disengage tooth 30b from ratchet wheel 34 to cause the parts to be relatched in their original position at the end of a single revolution.

It should be noted that such a single cycle of the card feed knife 14 after record cards 12 are initially placed in the hopper, will not be effective to feed a card into the bite of feed rolls 16 and 18. This is so because feed knife 14 is, as shown in Fig. 1, latched at a time after it has been advanced from its extreme right or card picking position about three quarters of a feed stroke to the left. Thus, when the clutch is initially engaged, the feed knife is first moved to the left to complete its feeding stroke, then returned to the extreme right position shown dotted and finally advanced toward the feed rolls 16 and 18 until it is again latched in the position of Fig. 1. During this latter advance, the bottom record card 12 in the hopper will be picked and moved by the feed knife toward the feed rolls 16 and 18, but the design is such that the card being carried by the feed knife will not be advanced to the bite of the feed rolls until the feed knife reaches its extreme position to the left. Thus, when clutch pawl 30, and clutch arm 32 are latched at the end of a single revolution, latching the feed knife in the position of Fig. 1, the leading edge of the card picked that cycle will have been advanced to a point just to the right of the bite of feed rolls 16 and 18, and will remain there until magnet 54 is again energized to initiate another card feed cycle. It is possible during normal operation of the machine to reenergize magnet R54 during each feed cycle, thus allowing the single revolution clutch to remain engaged and card feed knife 14 to be continuously reciprocated so that on each succeeding revolution of pulley 38 and hub 36 a card will be fed to the feeding rolls 16 and 18.

Card feed rolls 18 are secured to shaft 58, to which shaft is also secured pulley 60. This pulley is connected through belt 62 and pulley 64 to shaft 48 which shaft is, as previously explained, drivably connected to motor shaft 40. Shaft 58 and the attached feed rolls 18 will thus be continuously driven in a counterclockwise direction. Feed rolls 16 are mounted on shaft 66 which shaft is urged downward by spring loaded plunger 68a to cause the feed rolls 16 to be frictionally driven by feed rolls 18. Thus, the feed rolls 16 and 18 are continuously rotated to receive the records individually fed from the hopper 10 and advance them to the next pair of feed rolls 68 and 70.

It should be here pointed out that the driving connection to feed rolls 16 and 18, and to cam 20 which reciprocates feed knife 14, are such that the feed rolls will make two complete revolutions for every complete reciprocation of the feed knife. The diameter of the feed rolls 16 and 18 is such that each revolution is equivalent to the peripheral movement of the two inches. The machine is designed to operate with record cards of the well-known IBM type. These cards are placed in the hopper 10 and fed through the machine with their shorter dimension in the direction of feeding. This shorter dimension or length of the card, as fed, is three and one-quarter inches. Since during each successive reciprocation of feed knife 14, feed rolls 16 and 18 undergo a peripheral movement of four inches, it becomes apparent, that when magnet 54 is held energized and two records are successively fed from the hopper 10, the trailing edge of the first fed record will be at the bite of the feed rolls 16 and 18 at a time when the next fed card has been advanced by the feed knife to a point where its leading edges is three-quarters of an inch from the bite of the feed rolls 16 and 18.

As shown in Fig. 2, there is mounted between the feed rolls 18 on shaft 58 a contact roll 65. A sensing brush 67 is mounted to bear against the contact roll 65. The contact roll 65 and brush 67 are so situated that when a record card (Fig. 3a) is being fed by feed rolls 16 and 18, the brush 67 will extend through any perforation present in column 50 of the card completing an electrical circuit from the sensing brush 67 through contact roll 65 to a common brush 69. This sensing circuit in a manner later to be described controls the energization of magnet 54 and thereby the amount of overlapping between cards successively fed from the hopper 10.

There is also provided a card lever CL4 which is mounted at the bite of the feed rolls 16 and 18 and will be depressed to close contacts CLC4 as long as a card is being fed by these feed rolls. The purpose of the contacts CLC4 is to prevent the completion of circuits through the sensing brush to the contact roll except through a code perforation in a card being fed by feed rolls 16 and 18.

The second set of feed rolls 68 and 70, which are rotated at a slower speed than rolls 16 and 18, are disposed to receive the cards individually fed from feed rolls 16 and 18, and advance the cards received in an overlapping relationship to conveyer belt 80. These slower rotating feed rolls 68 and 70 are mounted below the feeding line of rolls 16 and 18 to facilitate the overlapping, and a formed spring 71 is provided to guide the cards from the level of rolls 16 and 18 to that of rolls 68 and 70. The two sets of successive feed rolls are so spaced apart that the leading edge of a record card being fed just reaches the bite of feed rolls 68 and 70 as the trailing edge of that card leaves the bite of feed rolls 16 and 18.

Conveyer belt 80 is provided with a plurality of equally spaced feed pins 83 which will engage similarly spaced guide holes 92 (see Fig. 4) in the overlapped cards to guide the cards in a fixed relationship past the lens 94 of a camera 96. The camera 96 is focused to photograph the printing on the portions of cards exposed between the masks 98 and 100 when the camera shutter 102 is tripped by a solenoid 104 which is periodically energized in a manner later to be described.

Shaft 90 on which the conveyer belt drive wheel 81 is secured, is continuously rotated in a counterclockwise direction since it is drivably connected to shaft 40 by belt 84 which connects pulleys 86 and 82 secured to shafts 40 and 90, respectively. The other conveyer belt drive wheel 78 is secured to shaft 88, as is pulley 79, which pulley is drivably connected by belt 76 to pulley 74. Pulley 74 is secured to shaft 72 as are feed rolls 70. Thus, feed rolls 70 will be continuously rotated in a counterclockwise direction, and will frictionally drive feed rolls 68 which rolls are secured to shaft 106, and urged against feed rolls 70 by the action of spring loaded plunger 108 pressing against shaft 106. The driving connection to shafts 90, 88 and 72 are such that these shafts are rotated at the same speed, and the diameter of the conveyer belt drive wheels 79 and 81, and feed rolls 68 and 70 is such that the peripheral speed of the teeth 83 on the conveyer belt is equal to that of the feed rolls 68 and 70. The relationship of the peripheral speed of these slower moving feed rolls 68 and 70 to that of the high speed rolls 16 and 18 is one to sixteen, the reason for which will become apparent during the following description of the record card used as a source document during machine operations.

Figure 3A:
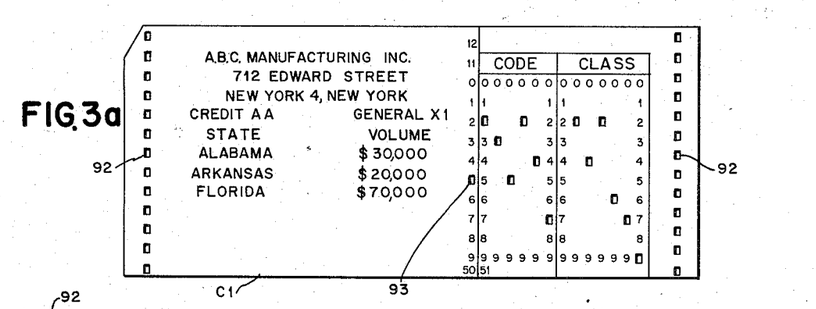
Figs. 3a, 3b, 3c and 3d show record cards containing printing, which cards are used as an input to the machine.

Referring to Fig. 3a, there is shown a record card of the well-known IBM type, which as has been heretofore explained is to be used as a source document in the preparation of reports. The record shown, as has been stated, is three and one-fourth inches in length along its shorter dimension, which dimension corresponds to the direction of feeding in the present machine. At either end of each record, there are provided a plurality of guide holes 92 which run the whole length of the card. There are thirteen of these guide holes 92 running along each side of every index card, and the distance between like portions of adjacent holes is one-quarter inch. Each record card may contain thirteen lines of printing, the bottom of each line coinciding with the bottom of one of the guide holes 92. Column 50 of the card is reserved for the line count perforation 93 which is indicative of the number of lines of printing contained on the card, or more specifically, indicates the last line on the card which contains printing. As is well-known, the IBM record card has provision for perforations in twelve index positions in each column, which index positions from top to bottom are 12, 11, 0, 1, 2, 3, 4, 5, 6, 7, 8, 9. In the present machine the cards are placed in the hopper 10, and advanced through the machine with the 12 edge of the card as the leading edge so that the index point positions are presented to the sensing brush 67 in the order set forth above.

In many cases, a single index card contains all the printed data pertinent to a particular item of information, but in some cases it might be necessary to utilize two or more successive cards to carry the printed data pertinent to a particular item. The first card of a series, where more than one card is needed, and the individual item card, where that is all that is required are termed heading cards. Where more than one card is required all of the successive cards after the first are termned trailer cards. In order to obtain proper spacing in any report to be printed, the first line on each heading card, which usually contains the title of the item, is printed on the second line of the card, whereas the trailer cards in any group may contain printing on all printing lines including the first.

The code utilized to identify the last line of printing on each card is illustrated in the following table in which the left hand column represents the last line counting from the 12 edge of the card which contains printing and the right hand column contains the corresponding line count perforation or lack thereof which designates the last line of printing on the card.

| Last line of printing: | Line count perforation |
|---|---|
| 1 | No perforation |
| 2 | 12 |
| 3 | 11 |
| 4 | 0 |
| 5 | 1 |
| 6 | 2 |
| 7 | 3 |
| 8 | 4 |
| 9 | 5 |
| 10 | 6 |
| 11 | 7 |
| 12 | 8 |
| 13 | 9 |

Figure 3B:
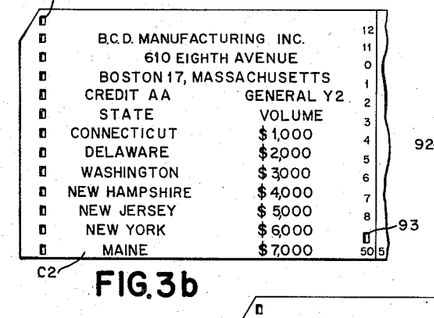
Figure 3C:
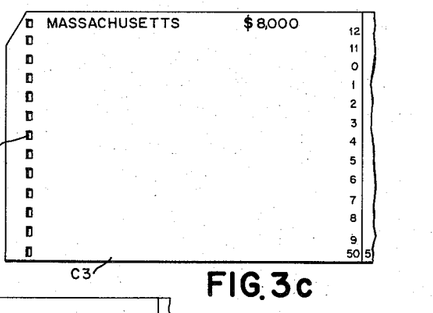
Figure 3D:
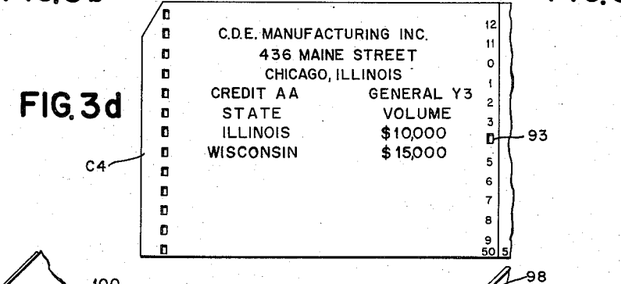

The coding, as well as the use of both heading and trailer cards, to represent particular items is presented in Figs. 3a, 3b, 3c and 3d. Fig. 3a shows the heading card C1 containing all the information with respect to a particular item. The first printing line on the card is blank as is the case with all heading cards, and the last line containing printing being the ninth, the code perforation in column 50, as shown, is in the 5 index position. Figs. 3b and 3c show a series of two index cards both of which pertain to the same item. The heading card C2 is similar to C1, but it contains a code perforation in the 9 index point position of column 50 since the last line of printing on this card is on the thirteenth printing line. On the trailer card C3, the first line of printing is on the first printing line and, since that is the only line of printing on the card, the code designation for this card is the lack of a perforation in column 50.

*Actual operation*

The electric circuit which is effective to control the machine to perform the above described functions will now be described with reference to the preparation of a film from a particular group of record cards. The record cards to be used in the preparation of the report are shown successively in Figs. 3a, 3b, 3c and 3d. The cards are placed in this order, face up, in the card hopper 10 with the twelve edge of the cards as the leading edge, that is with the twelve edge toward the first pair of feed rolls 16 and 18.

Placing the record cards in the hopper 10 will, through a card lever CL1, close contacts CLC1, which contacts will remain closed until the last card of the group is fed from the hopper. After the cards are so placed, a start key 120 is depressed. Referring to the circuit diagram of Fig. 7, depression of start key 120 will close contacts 122 to complete a circuit to energize motor relay MR, which circuit extends from a positive potential bus line L1, through contacts 122 and the relay MR to a negative potential bus line L2. Relay MR will be held energized by a circuit extending from line L1 through the now closed card lever contacts CLC1 and motor relay contacts MR1 to and through the relay to negative potential line L2. Energization of relay MR will close contacts MR2 to complete a circuit to start drive motor M, which motor will continue to run as long as contacts MR2 remain closed.

The motor M will rotate motor drive shaft 40 (Fig. 1) and through driving connections previously explained, shafts 90, 88, 72, 48, 58 and hub 36. Affixed to shaft 48, and thus rotating as long as the motor M is running, are a plurality of a well-known type of circuit breaker cams which operate a like number of associated contacts CB1 through CB13. The circuit breaker cams are not shown in the drawings, it being sufficient here to indicate the relative timing of the cam contacts (Fig. 5) and the manner in which the contacts are connected in the electric circuitry (Fig. 7). Also affixed to shaft 48 and rotated therewith is a brush 140 (Fig. 7) of a well-known type of brush commutator having twelve insulated segments 142. These segments are successively contacted by the rotating brush 140 in a timed relationship (Fig. 5), corresponding to the time at which the twelve successive index point positions in the record card are presented to the sensing brush 67. Another circuit breaker cam, not shown, is affixed to shaft 90 and operates associated contacts P20, the timing of which is indicated in Fig. 6.

Figure 5:
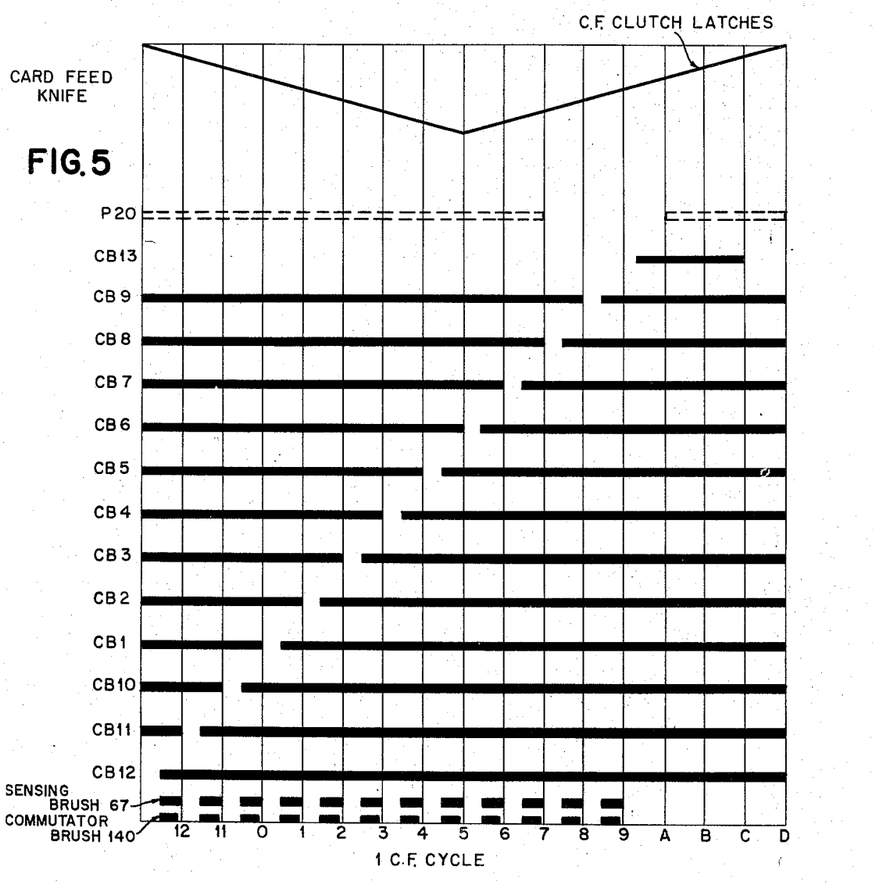
Fig. 5 is a timing diagram for one card feed cycle of the machine.
Figure 6:
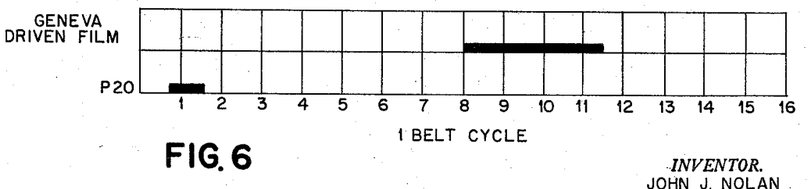
Fig. 6 is a timing diagram for one belt cycle of the machine.
Figure 7:
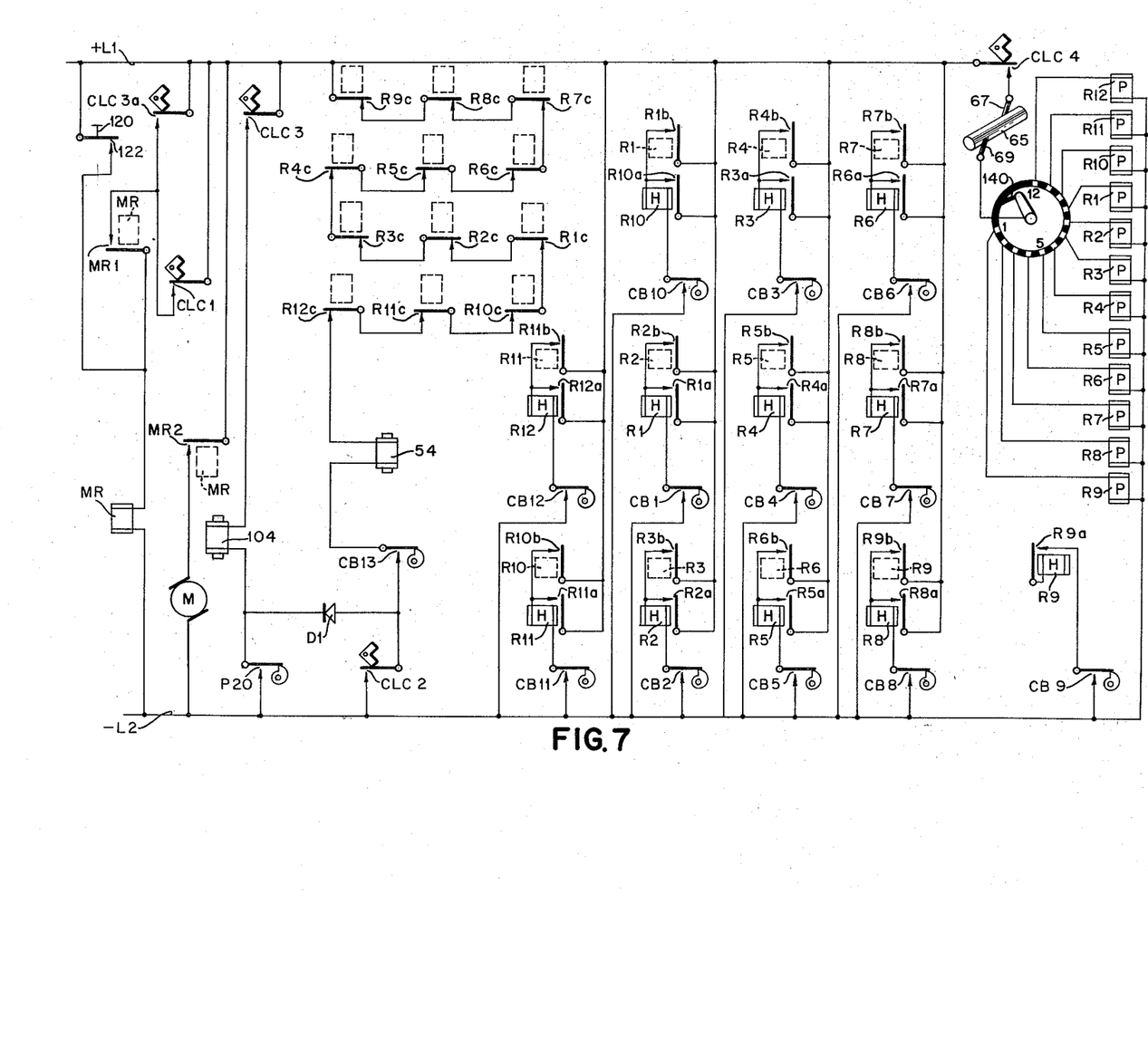
Fig. 7 is a wiring diagram of the electrical circuits of the machine.

The timing diagram of Fig. 6 is for a single revolution of shaft 90 which will be hereafter referred to as a belt cycle; and that of Fig. 5 for a single revolution of shaft 48 which will hereafter be referred to as a card feed cycle. Particular note should be made of the fact that as a result of the driving connections from motor shaft 40 to the shafts 48 and 90, the ratio of revolving speeds of the latter mentioned shafts is sixteen to one, so that there will be sixteen cycles of operation of the cam contacts CB1 through CB13, as shown in Fig. 5, for every cycle of operation of the contacts P20, as shown in Fig. 6.

Since hub 36 is operated at the same revolving speed as shaft 48, the feed knife 14, which is reciprocated by cam 20 when magnet 54 is energized to couple hub 36 to shaft 28, will have a cycle of operation equal to that of the cam contacts CB1 through CB13. Referring to Fig. 5, the latching point of the single revolution clutch which effects the above mentioned coupling is at B time of a card feed cycle; a single reciprocation of feed knife 14 upon energization of magnet 54 beginning at B time of one card feed cycle and ending at B time of the next card feed cycle.

In order to initiate card feed operations from the hopper 10, it is necessary to energize card feed clutch 54. Referring to Fig. 7, it will be seen that in order to accomplish energization of magnet 54, it is necessary that all of the series connected contacts R9c through R12c remain in the normally closed condition shown; that CB13 be closed; and that either card lever contacts CLC2 or cam contacts P20 be closed. Card lever contacts CLC2 are operated by a card lever CL2 which is mounted just to the left of the hopper 10. The card lever CL2 is so mounted that it will be depressed to close the associated contacts CLC2 at the very beginning of the movement of a card from the hopper 10, and will remain depressed until the last card in the hopper has reached the bite of feed rolls 16 and 18. Since card lever contacts CLC2 are now open, energization of the card feed clutch will first be accomplished when cam contacts CB13 and P20 are closed simultaneously. As has been explained, the shafts 48 and 90 on which the cam operated contacts CB13 and P20, respectively, are mounted, have a speed ratio of sixteen to one. Thus, a number of revolutions of shaft 48 depending upon the relative positions of the shafts when the start key is first depressed, may be necessary before contacts CB13 and P20 are simultaneously closed. The timing relationship of the two shafts is such that the closing of cam contacts P20 will, as shown dotted in Fig. 5, occur at a A time of a card feed cycle, and the contacts will remain closed until approximately 7 time of the next card feed cycle. The cam contacts P20 in a manner later to be described, control the periodic energization of the solenoid 104 which operates the camera shutter 102. The design of the machine is such that the leading or twelve edge of the first card fed from the hopper upon the first closing of cam contacts P20 will have been advanced to the mask 100 (Fig. 4), when the cam contacts P20 are closed for the third time after the start key is depressed. Upon this third closing of cam contacts P20, the solenoid 104 will be first energized and shutter 102 operated, at which time the cards fed from the hopper will be properly positioned for photographic recording on the first frame of film.

During the first card feed cycle in which cam contacts P20 are closed, a circuit will be completed to energize magnet 54, which circuit extends from line L1 through the normally closed contacts R9c through R12c, magnet 54, cam contacts CB13, crystal diode D1 and cam contacts P20 to negative pulse line L2. The crystal diode D1 is provided to allow current to pass through the energizing circuit in the direction above described, but to prevent a back circuit in the opposite direction. The card feed cycle during which magnet 54 is first energized shall be hereafter termed the first card feed cycle of machine operation and subsequent cycles will be designated with reference thereto.

With magnet 54 energized, the armature 56 will be attracted to allow the single revolution clutch to couple shaft 28 to continuously rotating hub 36, thus allowing cam 20 through follower arm 24 to reciprocate feed knife 14. As has been previously explained, feed knife 14 will not begin to advance the first card in the hopper until approximately 5 time in the next succeeding or second card feed cycle, and will have advanced the card so that its leading edge is just to the right of the bite of feed rolls 16 and 18 at B or latching time in this second card feed cycle of operation. However, this advance is sufficient to depress card lever CL2, and thus close card lever contacts CLC2. With the card lever contacts CLC2 closed, the parallel circuit to energize magnet 54 is completed so that the feed knife will continue its feed stroke to advance the first card at D time of this second card feed cycle to the bite of feed rolls 16 and 18.

As this first card C1 (Fig. 3a) is advanced by feed rolls 16 and 18, the sensing brush 67 will sense the code perforation in the 5 index point position of column 50. This sensing will allow a circuit to be completed to energize a relay R5 indicative of a 5 code perforation. The energizing circuit extends from line L1 through sensing brush 67, contact roll 65, common brush 69, commutator brush 140, the 5 segment 142 of the commutator to and through the pick coil of relay R5 to line L1. The pulse transmitted to energize relay R5 by this circuit is short, being available only as long as commutator brush 140 is in contact with the 5 segment 142 but a circuit is provided to hold relay R5 energized. This hold circuit extends from line L1 through contacts R5a now closed, the hold coil of relay R5 and cam contacts CB5, which are closed at the time the five hole is sensed, to line L2. Energization of relay R5 will open contacts R5c in the energizing circuit to the clutch magnet 54 so that at B time in the third card feed cycle of operation, armature 56 will again engage the pawl 30 and clutch arm 32 disengaging shaft 28 from continuously rotating hub 36 with the card feed knife in the position shown in Fig. 1.

Thus, at B time of this third card feed cycle, the second card C2 (Fig. 3b) of the group placed in the hopper 10 will have been advanced to a stationary position just to the right of the feed rolls 16 and 18 in which position the leading edge of the card will be holding depressed card lever CL2 to hold card lever contacts CLC2 closed. Just previous to this, specifically at A time of the third card feed cycle, the first fed card C1 will have been advanced by feed rolls 16 and 18 to the bite of feed rolls 68 and 70, which rolls will advance the card at a speed one-sixteenth of that which it was previously moving.

As before noted, the records utilized are three and one-quarter inches long in the direction of feeding and at A time the distance between the trailing edge of the first fed card C1 and the leading of the second feed card C2 is three-quarters of an inch. Thus the distance between the leading edges of the two successively fed cards is four inches which is equal to the peripheral advance imparted to the records by feed rolls 16 and 18 during one card feed cycle which constitutes two complete revolutions of these rolls. It, thus, becomes apparent that the slower moving feed rolls 68 and 70 will advance the first record one-sixteenth of this distance or one-fourth of an inch every card feed cycle, which advance is equal to the interline spacing on the records. If in fact, the clutch magnets 54 were held energized, allowing the feed knife 14 to continue to advance the second fed card to the feed rolls 16 and 18, the leading edge of that card would at A time during the next or fourth card feed cycle, reach the bite of feed rolls 68 and 70. At A time of the fourth card feed cycle, the leading edge of the card C1 will have been fed one-fourth of an inch past the bite of feed rolls 68 and 70, and thus the second fed card would under these conditions overlap all but the first printing line on card C1. Actually, the bottom of the first printing line is slightly less than one-fourth of an inch from the top of the card since, in order to keep a quarter inch interlining spacing and include thirteen lines of printing on each card, the bottom of the last line of printing must be just above the trailing edge of the card. This slight discrepancy is corrected when the cards are fed to the conveyer belt 80 and the guide holes 92 are engaged by guide pins 83.

During each successive card feed cycle, the card C1 will be advanced a distance equal to one printing line and thus it becomes clear that to obtain the proper overlapping, it is necessary that magnet 54 remain deenergized and card C2 remain stationary one card feed cycle for each successive line on card C1 other than the first which is to be exposed for photographic recording. In the present case there being eight lines of printing other than the first on card C1, it is necessary to delay energization of magnet 54 for eight successive card feed cycles.

As has been explained, relay R5 was energized and a holding circuit established to hold this relay energized during the third card feed cycle, during which cycle, at A time, the first fed card C2 reached the bite of feed rolls 68 and 70. With relay R5 held energized under control of cam contacts CB5, the energizing circuit to magnet 54 is not available and the feed knife 14 will be latched at B time of this third card feed cycle. Referring to the timing diagram of Fig. 5, it will be seen that contacts CB5 will be opened at 4 time of the next or fourth card feed cycle, allowing relay R5 to be deenergized and contacts R5c to again close. However, before relay R5 is deenergized, a circuit is available to energize relay R4 which circuit extends from line L1 through contacts R5b, the hold coil of relay R4 and cam contacts CB4 to negative potential line L2. Actually, relay R4 will have been first energized and then deenergized when contacts CB4 are opened at 3 time of the fourth card feed cycle. However, the energizing circuit to relay R4, as above described, will be again available when contacts CB4 makes one-half before 4 time, and, thus, before the opening of cam contacts CB5.

Relay R4 will be held energized until the next or fifth card feed cycle, thus, opening contacts R4c and preventing magnet 54 from being energized during the fourth card feed cycle. During the fifth card feed cycle, the circuit operation is similar to that above described, relay R3 being energized by the circuit through contacts R4b and cam contacts CB3 just before cam contacts CB4 are opened to deenergize relay R4. Relay R3 will be held energized during the fifth card feed cycle under control of cam contacts CB3, and relay contacts R3c will be held open to prevent energization of the magnet 54. The circuit connections of the remaining relays in the group are similar, and relays R2, R1, R0, R11 and R12 will be successively energized in that order to open their c contacts and prevent energization of clutch magnet 54 during the sixth, seventh, eighth, ninth and tenth card feed cycle.

The leading edge of the first fed card C1 was advanced to the bite of feed rolls 68 and 70 at A time of the third card feed cycle and at A time of this tenth card feed cycle, this card will have been advanced by these feed rolls to a point where the bottom of the seventh printing line is coincident with the bite of these feed rolls. During the next or eleventh card feed cycle, contacts R9c through R12c again being closed, magnet 54 will again be energized by the circuit above described through cam contacts CB13 and card lever contacts CLC2 so that at B time of this cycle the feed knife 14 will continue its feeding stroke to the left to advance the record card C2 to the bite of feed rolls 16 and 18. The leading edge of card C2 will reach the bite of feed rolls 16 and 18 at D time of this eleventh card feed cycle. These feed rolls will advance card C2 at high speed so that, at A time of the twelfth card feed cycle, the leading edge of this card will arrive at the bite of feed rolls 68 and 70. At this time the bottom of the ninth or last printing line on card C1 will also be at the bite of feed rolls 68 and 70. The cards C1 and C2 will thus continue to be advanced by feed rolls 68 and 70 with the second fed card C2 overlapping that portion of the first fed card C1 which does not contain printing.

As the record card C2 was advanced by feed rolls 16 and 18 during the twelfth card feed cycle, the code perforation in the ninth index point position in column 50 of the card was sensed by brush 67 to complete a circuit to energize the proper code relay R9. This circuit extends in Fig. 7 from line L1 through sensing brush 67, contact roll 65, common brush 69, commutator brush 140, the ninth commutator segment 142 to and through the pick coil of relay R9 to line L2. Once energized, relay R9 will be held energized by a circuit extending from line L1 through contacts R9a now closed, the hold coil of relay R9 and cam contacts CB9 to line L2. The energization of relay R9 will open contacts R9c, thus preventing energization of magnet 54 during this twelfth card feed cycle. Since there are twelve lines of printing other than the first on card C2, it will be necessary to prevent reenergization of magnet 54 for a total of twelve card feed cycles. This is accomplished in a manner similar to that previously described with reference to the circuit operation after the energization of relay R5 as a result of the sensing of the five perforation in card C1. Thus, the energization of relay R9 will prevent energization of magnet 54 during the twelfth card feed cycle and the remaining code relays R8 through R12 in the series will be energized on successive cycles to prevent energization of magnet 54 during the thirteenth through the twenty-third card feed cycles.

When during the twenty-fourth card feed cycle, all of the contacts R9c through R12c are again closed, magnet 54 will again be energized, and feed knife 14 again operated to advance card C3 so that its leading edge will reach the bite of rolls 16 and 18 at D time of this cycle. Rolls 16 and 18 will continue the advance to card C3 so that its leading edge will reach the bite of the slower moving feed rolls 68 and 70 at A time of the next or twenty-fifth card feed cycle. Since the leading edge of card C2 reached feed rolls 68 and 70 at A time of the twelfth card feed cycle, this card will have been advanced by A time of the twenty-fifth card feed cycle to a point where its trailing edge is coincident with the bite of the feed rolls. Thus, card C3 will not overlap the previously fed cards C2, and the cards will continue their advance towards the conveyor belt 80 with the leading edge of card C3 immediately adjacent the trailing edge of card C2.

The spacing between shafts 88 and 72 is such that while the operation above described with reference to cards C2 and C3 is taking place, the first guide hole 92 of card C1 will have been engaged at approximately A time of the fifteenth card feed cycle by a guide pin 83 passing the vertical center line of the conveyor wheel 79. Since the peripheral speed of belt 82 is equal to that of feed rolls 68 and 70, the overlapping relationship between cards C1 and C2 will be maintained, and at A time of the twenty-fourth card feed cycle, the first guide hole 92 in card C2 will be similarly engaged by a guide pin 83 at the vertical center line of conveyor belt wheel 79. Since the guide pins 83 are spaced apart to engage successive guide holes 92 on the cards, the tenth guide hole of the first fed card C1 will be engaged by the same pin which engages the first guide hole on cards C2. The forked biasing spring 150 aids in proper positioning the guide holes on the pins, and since each guide hole is coincident with the bottom of a printing line, the slight discrepancy in overlapping previously mentioned will be at this time corrected.

Since there is no code perforation in card C3, the magnet 54 will be again energized during card feed cycle 25, and card C4 will be advanced to feed rolls 68 and 70 in the manner above described. Cards C3 and C4 will arrive at the bite of the latter mentioned feed rolls on succesive cycles. This being the case, the card C4 will overlap all of card C3 but the first printing line which is correct since that is the only line on that card containing data to be recorded. As the last card of the group C4 is fed from the hopper 10, card lever contacts CLC1 will have been opened, but a parallel circuit is provided from a pair of card lever contacts CLC3a to maintain the motor relay MR energized, and keep the motor M running. Card lever contacts CLC3 and CLC3a are operated by a card lever CL3 which card lever will be depressed when the leading edge of the first fed card is about three inches from the mask 100 and will be held depressed by the successively fed cards until the trailing edge of the last card has been stripped from the conveyor belt 80 as it is being stacked in stacker 152.

Figure 4:
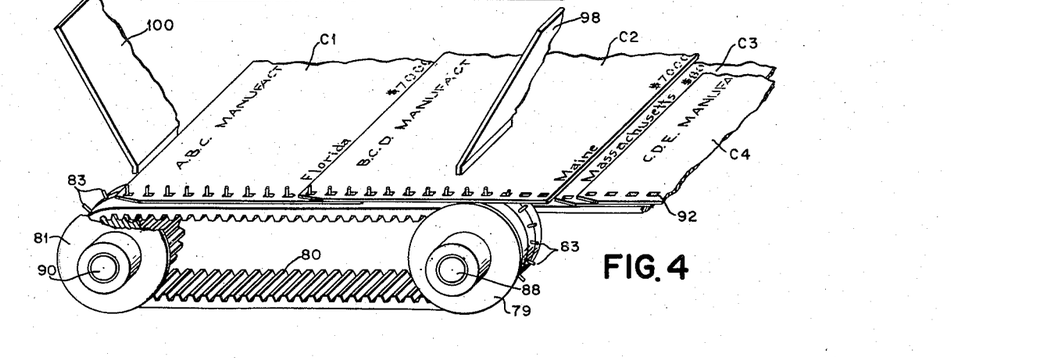
Fig. 4 shows the cards, arranged in the proper overlapping relationship, being presented at the photographic station of the machine.

The records originally placed in the hopper 10 are thus continuously advanced in the proper overlapping relationship to the card photographing area which is defined by the two masks 98 and 100. These masks are spaced apart a distance of four inches so that on one each frame of film there will be recorded sixteen successive printing lines. The distance between the hopper 10 and mask 100 is such that the leading edge of the card C1 will arrive at the mask 100 at A time of the thirty-third card feed cycle. At this time, a circuit will be available to energize solenoid 104 to trip the shutter 102 of camera 96. The shutter speed is sufficiently fast to record on the frame of film, the sixteen printing lines present on the moving cards C1 and C2 which are then exposed between the masks 100 and 98, as shown in Fig. 4. The energizing circuit to solenoid 104 extends, in Fig. 7, from line L1 through card lever contacts CLC3 now closed, solenoid 104 and cam contacts P20 to line L2. As previously pointed out, cam contacts P20 are closed at A time of every sixteenth card feed cycle, and having been closed to initiate the first card feed cycle, they will again be made at A time of the thirty-third card feed cycle. The closing of these contacts during the seventeenth card feed cycle was ineffective to energize solenoid 104 because at that time card lever contacts CLC3 were not closed. After the first photographic recording, the cards will continue to be advanced to present the next sixteen printing lines to the photographic area for recording at A time of the forty-ninth card feed cycle.

Referring to Fig. 1, there is shown a pulley 160 connected to shaft 72, which shaft is rotated at the slower of the two machine speeds, making one revolution for every sixteen card feed cycles. Pulley 160 through belt 162 drives another pulley 168 which is secured to shaft 166 as is disc 170 which carries a roller stud 174. The shaft 166 will undergo one revolution every sixteen card feed cycles causing the stud 174 to engage one of the slots in Geneva wheel 172 and advance the film sprocket 176. Since, as is shown in Fig. 6, this advance of the film takes place after the operation of cam contacts P20, the film 178 will be advanced a uniform distance equal to the desired frame length between successive energizations of solenoid 104. Thus, when during the forty-ninth card feed cycle, the solenoid 104 is again energized, the next sixteen printing lines which are contained on cards C2, C3 and C4 will have been advanced to the photographic area to be recorded on the next portion of film advanced as above explained after the first energization of solenoid 104. The records as they continue their advance from the photographic area will be stripped from the conveyor belt 80 by frame piece 180 and stacked in the stacker 152. A circuit is available in Fig. 7 from line L1 through contacts CLC3, MR1 and the MR relay to hold that relay energized and keep motor M running until the last card C4 has been stripped from the conveyer belt 80 and begun its descent into stacker 152.

It has been shown how the machine embodying the disclosed invention can be utilized to prepare a film from a series of record cards, which film might be later used for the preparation of a printed report. Though only four record cards have been considered in the operation above described, it is, of course, obvious that large groups of records carrying varying numbers of lines of printing might be processed in the same manner to prepare a film for a report of any scope desired.

While there have been shown and described and pointed out the fundamental features of the invention as applied to a preferred embodiment, it will be understood that various omissions and substitutions and changes in the form and details of the device illustrated and in its operation may be made by those skilled in the art, without departing from the spirit of the invention. It is the intention, therefore, to be limited only as indicated by the scope of the following claims.

What is claimed is:

1. In a machine for photographically recording data represented by one or more lines of printing on individual records each bearing a designation indicative of the number of such lines printed thereon, a record hopper, means operable each time it is actuated to feed an individual record from said hopper, means for sensing the designation on each record fed, means actuable by said sensing means upon sensing a designation in a record to actuate said feed means to feed the succeeding record after a period proportional to the number of lines of data printed on the sensed record, a photographing station, means for conveying records past said photographing station, and intermediate feeding means for receiving each record fed from said hopper and depositing it on said conveying means overlapping the preceding record an amount varying in proportion to the number of lines of data printed on the preceding record.

2. In a machine for recording data represented by varying sized groupings of printing on individual records each bearing a designation indicative of the size of the grouping printed thereon, a record hopper, means operable each time it is actuated to feed an individual record from said hopper, means for sensing the designation in each record fed, means controlled by said sensing means to actuate said feed means to feed the succeeding record after a period proportional to the size of the grouping on the sensed record, conveying means for receiving the records fed from said hopper, and means for moving said conveying means relative to said hopper to cause each record to be received thereon in a spacial relationship to the preceding record varying in proportion to the size of the grouping on the preceding record.

3. In a machine for photographically recording data represented on one or more lines on individual records each bearing a designation indicative of the number of lines thereon to be recorded, a record hopper, means operable each time it is actuated to feed an individual record from said record hopper, means for sensing the designation on each record fed, means actuable by said sensing means upon sensing a designation in a record to actuate said feed means to feed the succeeding record after a period proportional to the designated number of lines of data on the sensed record, conveying means disposed to receive the records fed from said hopper, and means for moving said conveying means relative to said hopper to cause each record to be received thereon in such a spacial relationship as to leave exposed only the designated lines of data on the preceding record.

4. In a machine for photographically recording data represented on one or more lines on individual records each bearing a designation indicative of the number of lines thereon to be recorded, a record hopper, means operable each time it is actuated to feed an individual record from said hopper, means for sensing the designation on each record fed, means actuable by said sensing means upon sensing a designation in a record to actuate said feed means to feed the succeeding record after a period proportional to the designated number of lines of data on the sensed record, conveying means disposed to receive the records fed from said hopper, and means for moving said conveying means relative to said hopper to cause each record received thereon to overlap the preceding record an amount varying in proportion to the designated number of lines of data on the preceding record.

5. In a machine for photographically recording data represented by one or more lines of printing on individual records each bearing a designation indicative of the number of such lines printed thereon, a record hopper, means operable each time it is actuated to feed an individual record from said hopper, means for sensing the designation on each record fed, means actuable by said sensing means upon sensing a designation in a record to actuate said feed means to feed the succeeding record after a period proportional to the number of lines of data printed on the sensed record, conveying means disposed to receive the records fed from said hopper, means for moving said conveying means relative to said hopper to cause each record received thereon to overlap the preceding record an amount varying in proportion to the number of lines of data printed on the preceding record, and photographing means actuable to record in the form of a continuous listing the lines of printing contained on the exposed portions of a group of said records on said conveying means.

6. In a machine for photographically recording data represented by one or more lines of printing on individual records each bearing a designation indicative of the number of such lines printed thereon, a record hopper, means operable each time it is actuated to feed an individual record from said hopper, means for sensing the designation on each record fed, means actuable by said sensing means upon sensing a designation in a record to acatute said feed means to feed the succeeding record after a period proportional to the number of lines of data printed on the sensed record, conveying means disposed to receive the record fed from said hopper, means for moving said conveying means relative to said hopper to cause each record received thereon to overlap the preceding record an amount varying in proportion to the number of lines of data printed on the preceding record, a pair of masks spaced apart to define a photographing area on said conveying means, a camera operable each time it is actuated to record from the exposed portions of a plurality of said records the lines of printing then present between said masks, means operable to advance the film in said camera after it is actuated, and means for periodically actuating said camera to cause each successive frame of film to be exposed to record a like number of successive lines of printing.

7. In a machine for photographically recording data represented by one or more lines of printing on individual records each bearing a designation indicative of the number of such lines of printing thereon, a record hopper, a photographing station, first mechanism for feeding records individually from said hopper, second mechanism disposed for receiving the records fed from said hopper and feeding them past said photographing station, means intermediate said hopper and said photographing station for sensing the designations on the records fed, and means controllable by said sensing means for driving said first and second feeding mechanisms relative to each other so as to cause the records fed individually from said hopper to be fed past said photographing station in a spacial relationship varying in proportion to the number of lines of data on the individual records.

8. In a machine for photographically recording data represented by one or more lines of printing on individual records each bearing a designation indicative of the number of such lines of printing thereon, a record hopper, a photographing station, first mechanism for feeding records from said hopper, second mechanism disposed for receiving the records fed from said hopper and feeding them past said photographing station, controllable means for normally driving said first and second feeding mechanisms relative to each other so as to cause the records individually fed from said hopper to be fed in a predetermined uniform spacial relationship past said photographing station, means intermediate said hopper and said photographing station for sensing the designations on the records fed, and means actuable by said sensing means to control said driving means to drive said first anad second feeding mechanisms relative to each other so as to cause the records fed individually from said hopper to be fed past said photographing station in a spacial relationship varying in proportion to the number of lines of data on the individual records.

9. In a machine for photographically recording data represented by one or more lines of printing on individual records each bearing a designation indicative of the number of such lines printed thereon, a record hopper, controllable means operable to successively feed individual records from said hopper, a conveying mechanism disposed to collect the records fed by said feeding means, means for sensing the control designations on each record fed, means actuable by said sensing means upon sensing a designation in a record to control said feed means to displace the succeeding record from said hopper spaced apart from the sensed record a distance varying in accordance with the designation sensed, and means for driving said conveying mechanism to displace the records thereon at a rate slower than the displacement effected by said feeding means to cause the successively fed records to be collected on said conveying mechanism in an overlapping relationship varying in accordance with the space between the successive records as fed.

10. In a machine for photographically recording data represented by one or more lines of printing on individual records each bearing a designation indicative of the number of such lines printed thereon, a record hopper, mechanism for successively feeding the individual records from said hopper, conveying mechanism disposed to receive the records fed by said feeding mechanism, driving means, controllable clutch means normally effective to connect said driving means to said feeding mechanism to cause the records to be displaced from said hopper in a uniform spaced relationship, means for sensing the designation on each record fed, means actuable by said sensing means upon sensing a designation in a record for controlling said clutch to disconnect said feeding mechanism from said driving means for a period proportional to the designation sensed, each successive record being displaced from said hopper spaced apart from the preceding record a distance varying in accordance with the number of lines of data printed on the preceding record, means for driving said conveying mechanism to displace the records received thereon at a rate slower than the displacement effected by said feeding mechanism to cause the successively fed records to be received on said conveying mechanism in an overlapping relationship varying in accordance with the space between the successive records as fed.

11. In a machine for photographically recording data represented by one or more lines of printing on individual records each bearing a designation indicative of the number of such lines printed thereon, a record hopper, mechanism for successively feeding the individual records from said hopper, a photographing station, conveying mechanism disposed to receive the records fed and convey them past said photographing station, driving means, controllable clutch means normally effective to connect said driving means to said feeding mechanism to cause the records to be displaced from said hopper in a uniform spaced relationship, means for sensing the designation on each record fed, means actuable by said sensing means upon sensing a designation on a record for controlling said clutch to disconnect said feeding mechanism from said drive means for a period proportional to the designation sensed, each successive record being displaced from said hopper spaced apart from the preceding record a distance varying in accordance with the number of lines of data printed on the preceding record, and means for driving said conveying mechanism to displace the records received thereon at a rate slower than the displacement effected by said feeding mechanism to cause the successively fed records to be received on said conveying mechanism in an overlapping relationship varying in accordance with the space between the successive records as fed, and a camera operable when actuated to record from the exposed portions of a plurality of said records on said conveying means the lines of printing then present at said photographing station.

12. In a machine for photographically recording data represented by one or more lines of printing on individual records each bearing a designation indicative of the number of such lines of printing thereon, a record hopper, a photographing station, first means for feeding records from said hopper, second means disposed for receiving the records fed from said hopper and feeding them past said photographing station, controllable means normally operable to drive said first and second feeding means relative to each other to cause records to be fed from said hopper at a rate normally in a fixed proportion to the rate of feeding records past said photographing station, means intermediate said hopper and photographing station for sensing the designations in the records fed, and means actuable by said sensing means for controlling said drive means to drive said first and second feeding means relative to each other so as to vary the proportional feeding rates of the respective records at said hopper and photographing station in accordance with the designation sensed.

13. In a machine for recording data represented on varying sized portions of individual records each bearing a designation indicative of the portion thereof on which data to be recorded is represented, a record hopper, a recording station, first mechanism for feeding records from said hopper, second mechanism for receiving records fed from said hopper and feeding them to said recording station, means intermediate said hopper and recording station for sensing the designations on the records fed, and means controllable by said sensing means in accordance with the designations sensed for driving said first and second feeding mechanisms relative to each other so as to cause the records fed from said hopper to be fed to said recording station in a spacial relationship varying in proportion to the portions of the individual records on which data to be recorded is represented.

14. In a machine for recording data represented on varying sized portions of individual records each bearing a designation indicative of the portion thereof on which data to be recorded is represented, a record hopper, a recording station, first mechanism for feeding records from said hopper, second mechanism for receiving records fed from said hopper and feeding them to said recording station, means intermediate said hopper and recording station for sensing the designations on the records fed, and means controllable by said sensing means in accordance with the designations sensed for driving said first and second feeding mechanisms relative to each other so as to cause the records fed from said hopper to be fed to said recording station in an overlapping or tandem relationship in accordance with the portions of the individual records on which data to be recorded is represented.

References Cited in the file of this patent

UNITED STATES PATENTS

| | | |
|---|---|---|
| 1,563,045 | Schaffer | Nov. 24, 1925 |
| 2,357,674 | McConnell | Sept. 5, 1944 |